(12) United States Patent
Shiraishi

(10) Patent No.: US 7,791,771 B2
(45) Date of Patent: Sep. 7, 2010

(54) IMAGE READING APPARATUS, IMAGE READING UNIT, AND LIGHT IRRADIATION APPARATUS

(75) Inventor: Ryuuichi Shiraishi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1401 days.

(21) Appl. No.: 10/935,232

(22) Filed: Sep. 8, 2004

(65) Prior Publication Data

US 2005/0213167 A1    Sep. 29, 2005

(30) Foreign Application Priority Data

Mar. 24, 2004   (JP)   ............................. 2004-087928

(51) Int. Cl.
H04N 1/04    (2006.01)

(52) U.S. Cl. ...................... 358/475; 358/474; 358/483; 358/509

(58) Field of Classification Search ................... 368/62, 368/82, 83, 223, 239, 241; 257/666, 676; 345/156, 183; 379/376.01, 373.01; 235/462.42, 235/462.41; 362/612, 600, 611, 539, 303, 362/305; 399/1, 2, 3, 4; 347/245, 233; 348/744, 348/739; 385/14; 358/474, 471, 400, 475, 358/483, 509, 512

See application file for complete search history.

(56) References Cited

U.S. PATENT DOCUMENTS

| | | | | |
|---|---|---|---|---|
| 4,547,666 A | * | 10/1985 | Heal | ...................... 250/227.26 |
| 4,731,542 A | * | 3/1988 | Doggett | ....................... 250/548 |
| 5,187,595 A | * | 2/1993 | Kitani et al. | ................. 358/482 |
| 5,357,099 A | * | 10/1994 | Tabata et al. | .............. 250/208.1 |
| 5,473,410 A | * | 12/1995 | Nishi | .......................... 355/53 |
| 6,181,442 B1 | * | 1/2001 | Ogura et al. | ................. 358/475 |
| 6,226,026 B1 | * | 5/2001 | Suzuki | ....................... 347/241 |
| 6,522,386 B1 | * | 2/2003 | Nishi | ........................... 355/52 |
| 6,661,497 B2 | * | 12/2003 | Tabata et al. | .................. 355/69 |
| 7,136,203 B2 | * | 11/2006 | Yokota et al. | ................ 358/484 |

FOREIGN PATENT DOCUMENTS

JP    A 2001-313794    11/2001

* cited by examiner

Primary Examiner—Houshang Safaipour
(74) Attorney, Agent, or Firm—Oliff & Berridge, PLC

(57) ABSTRACT

An image reading apparatus includes: a light source configured with an array of plural point light sources; a light receiving sensor that receives reflected light from a document to which light has been applied from the light source; and shading members that shade main light in irradiation light applied to a position of document reading by the light receiving sensor from the plural point light sources constituting the light source.

2 Claims, 14 Drawing Sheets

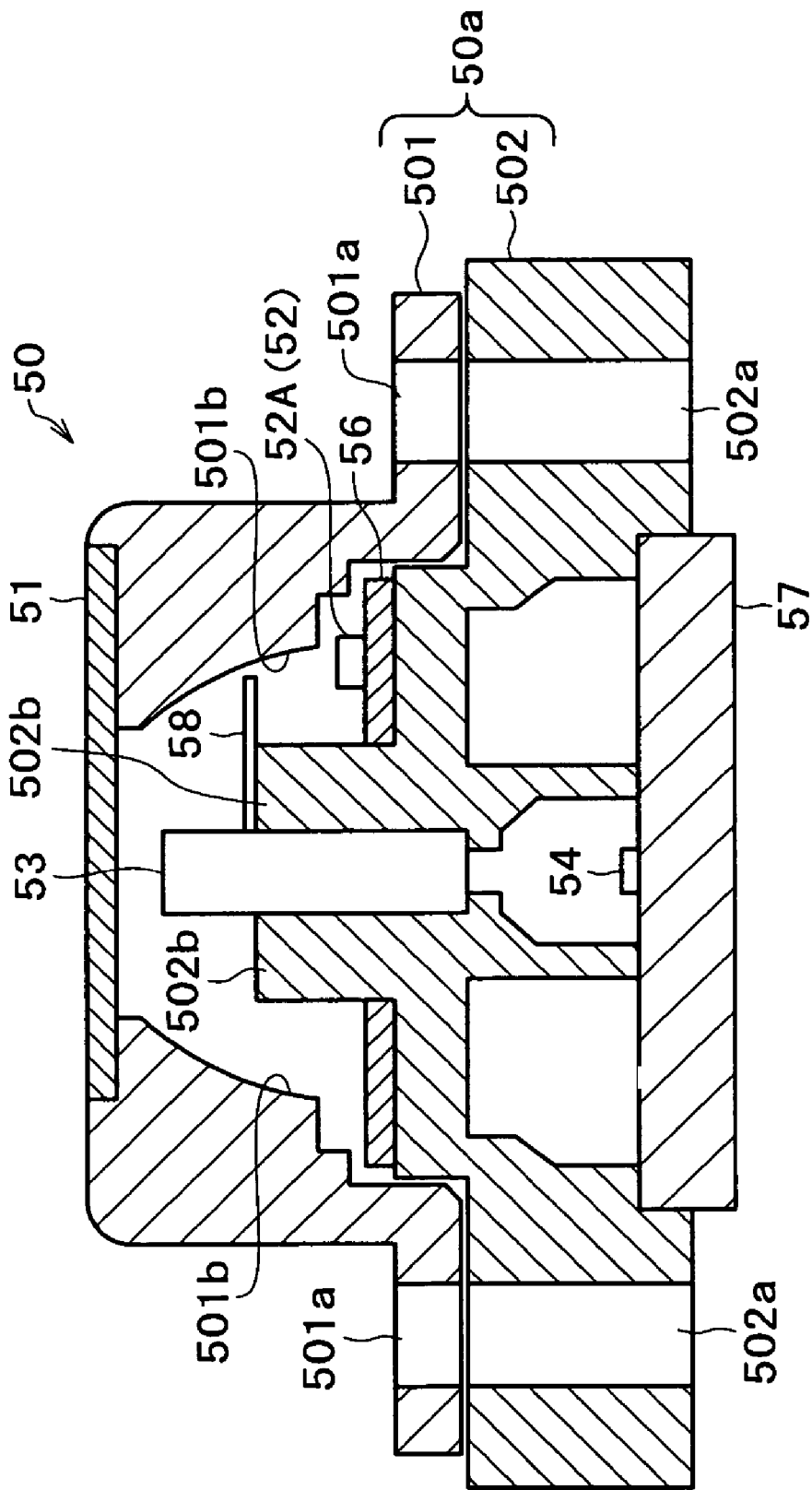

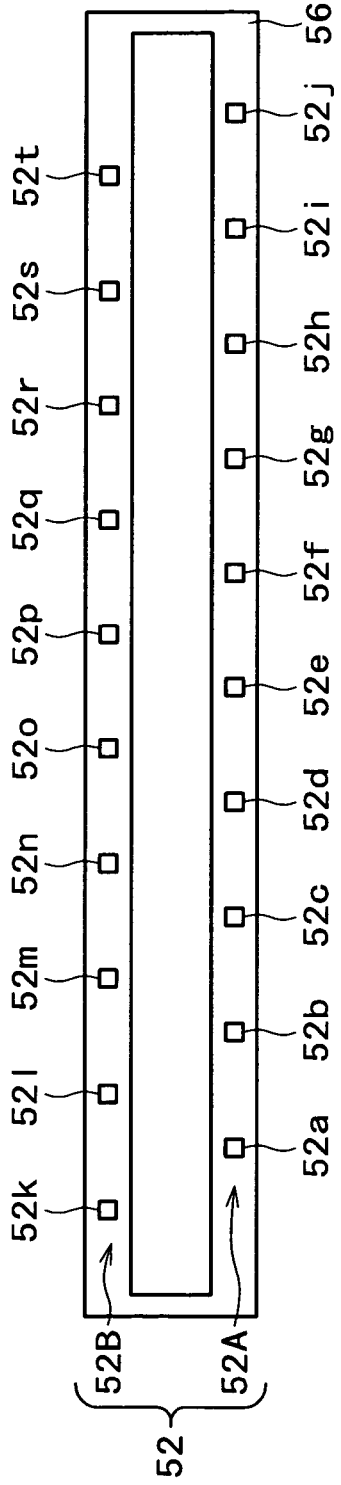
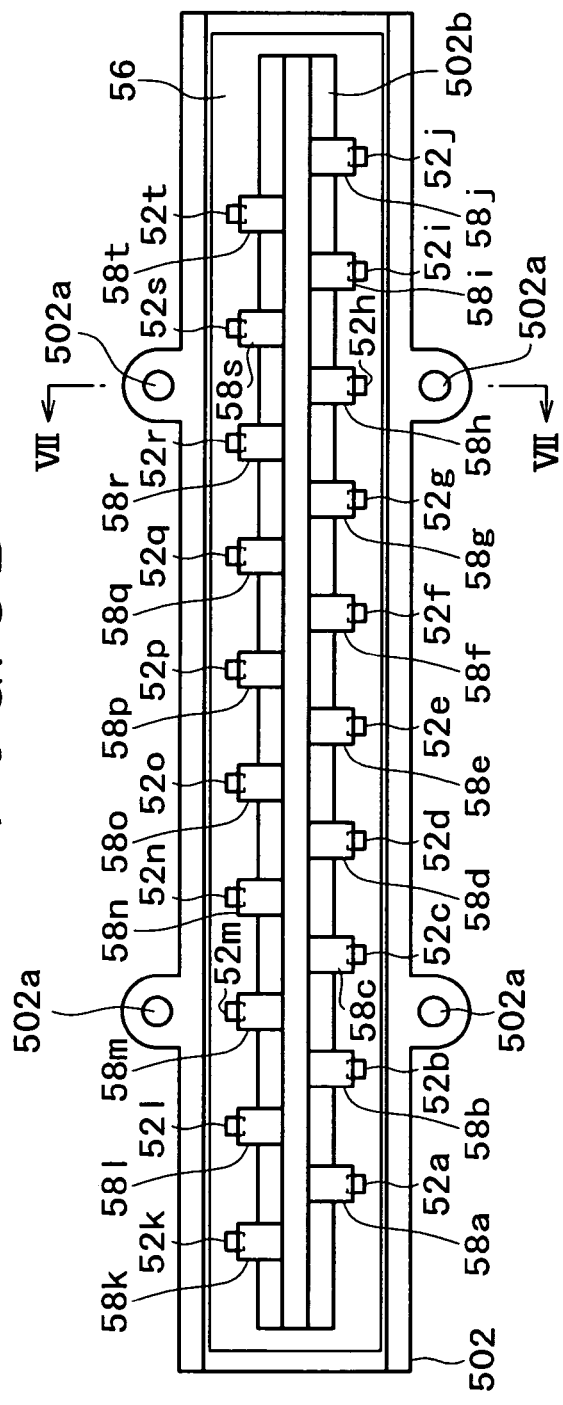
FIG. 8A
FIG. 8B

F I G. 1 0 A
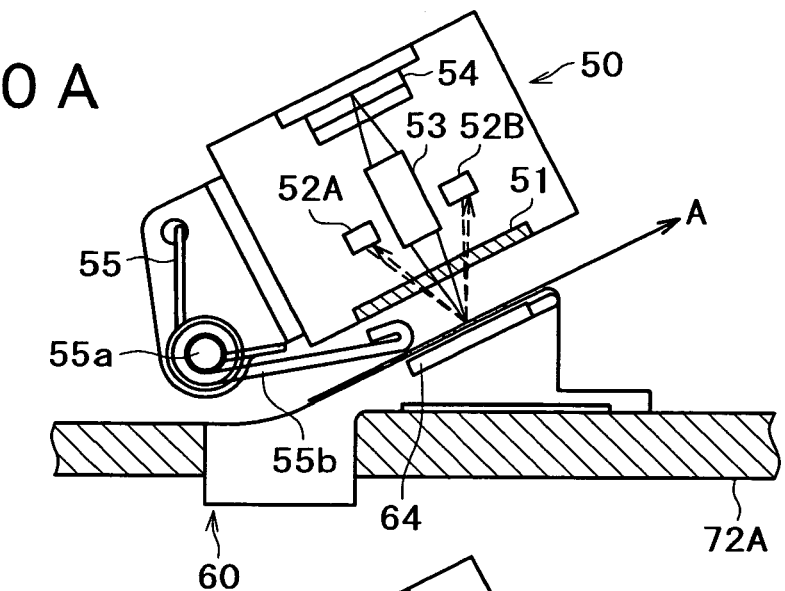
F I G. 1 0 B
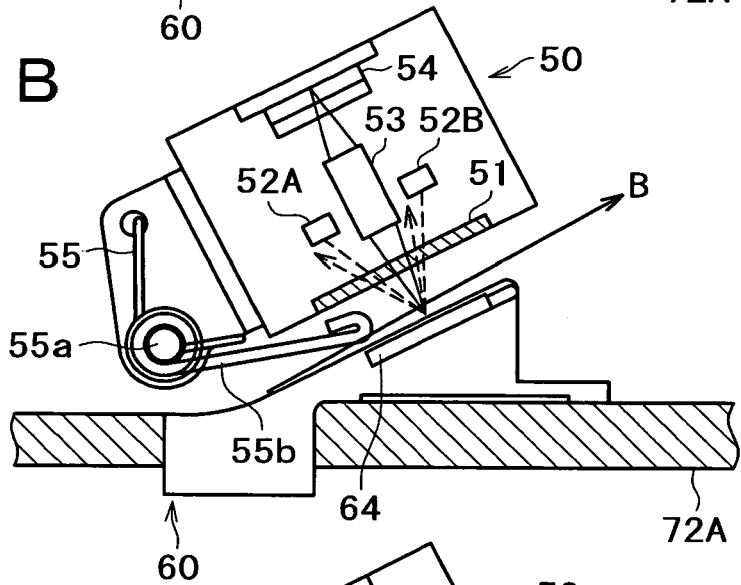
F I G. 1 0 C
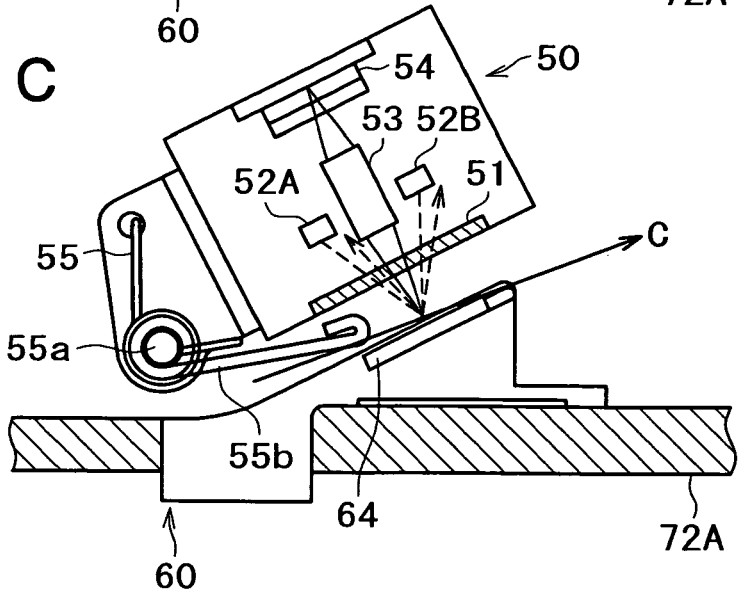

F I G. 1 1 A
OUTPUT DATA
SHADING DATA
OVERALL ILLUMINATION DISTRIBUTION
ILLUMINATION DISTRIBUTION OF LED ARRAYS
LED DISPOSITION

F I G. 1 1 B
OUTPUT DATA
SHADING DATA
OVERALL ILLUMINATION DISTRIBUTION
ILLUMINATION DISTRIBUTION OF LED ARRAYS
LED DISPOSITION

F I G. 1 1 C
OUTPUT DATA
SHADING DATA
OVERALL ILLUMINATION DISTRIBUTION
ILLUMINATION DISTRIBUTION OF LED ARRAYS
LED DISPOSITION

F I G. 1 4
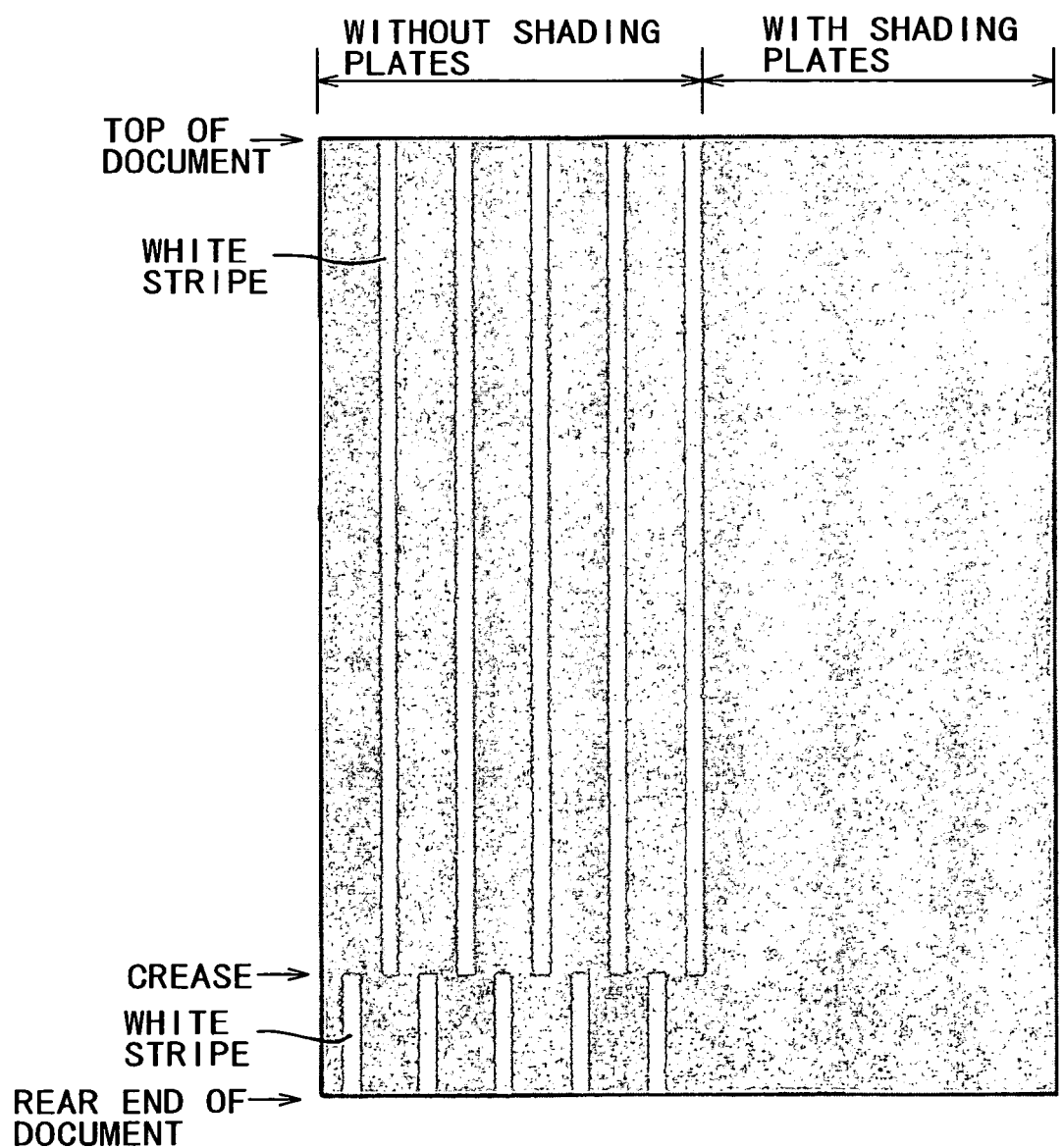

IMAGE READING APPARATUS, IMAGE READING UNIT, AND LIGHT IRRADIATION APPARATUS

BACKGROUND OF THE INVENTION

1. Field of the Invention

The present invention relates to an image reading apparatus that reads an image on a document, and more particularly to an image reading apparatus that uses a light source configured with an array of point light sources such as LED (Light Emitting Device) to apply light onto a document, and reads an image by receiving reflected light from the document.

2. Description of the Related Art

It is known to provide an image reading apparatus that automatically reads image information of documents has been used as a reading apparatus such as a copier and a facsimile, and a scanner for input to a computer. This type of image reading apparatus uses a light source extended in a fast-scanning direction with respect to a fed document to apply light to it, and receives reflected light reflected from the irradiated document in a reading section to read an image.

This type of image reading apparatus may suffer variances in quantities of light applied from a light source depending on positions in the fast-scanning direction, and secular changes in light quantities of the light source. The variances and changes in light quantities will cause output image signals to vary depending on light quantities of a light source to be outputted when a document on which a half-tone image is formed uniformly is read.

In a conventional image reading apparatus, e.g., a fluorescent lamp has been used as a light source. Recently, however, a LED array configured with an array of plural LEDs is being used to miniaturize an apparatus and reduce power consumption. The fluorescent lamp can be regarded as a line light source and its illumination distribution is substantially constant in the fast-scanning direction. On the other hand, the LED array can be regarded as a light source configured with an array of plural point light sources, and its illumination distribution has a form waving in the fast-scanning direction, with a peak in a location corresponding to main light of each LED. As a result, when a LED array is used as a light source, obtained shading data also has a wavy form corresponding to the illumination distribution.

However, in the case where a LED array is used as a light source, the following problems occur.

For example, when a fed document inclines with respect to a reading face (white reference face) of a white reference member, if image data obtained by reading the inclined document is subjected to shading correction using shading data obtained in advance by reading the white reference member, since a reflection direction of light applied onto the document from a light source differs from that at the time of shading data acquisition, density nonuniformity will remain in the image data posterior to the shading correction in the fast-scanning direction.

Also, in the case where LED arrays are respectively disposed upstream and downstream of a document feeding direction with a reading section sandwiched, and LEDs constituting the each LED are disposed in a staggered fashion, if a fed document inclines, the balance between reflected light entering the reading section based on irradiation light by the upstream LED array and reflected light entering the reading section based on irradiation light by the downstream LED array will collapse. In such a case, if image data obtained by reading the inclined document is subjected to shading correction using shading data obtained in advance by reading the white reference member, density nonuniformity will occur due to a difference between illumination distributions during shading data acquisition and during reading.

SUMMARY OF THE INVENTION

The present invention has been made to address the above-mentioned technical problems and reduces variances in illumination distributions when a light source configured with plural point light sources is used.

Also, the present invention reduces influence on reading image data due to a collapse of document posture when a light source configured with plural point light sources is used.

An image reading apparatus according to an aspect of the present invention includes: a light source configured with an array of plural point light sources; a light receiving sensor that receives reflected light from a document to which light has been applied from the light source; and shading members that shade main light in irradiation light applied to a position of document reading by the light receiving sensor from the plural point light sources constituting the light source.

According to the present invention, when a light source configured with plural point light sources is used, variances in its illumination distributions can be reduced.

BRIEF DESCRIPTION OF THE DRAWINGS

Embodiments of the present invention will be described in detail based on the followings, wherein:

FIG. 7 is a sectional view of CIS;

FIG. 8A is a drawing showing the upper face of a LED board on which a LED array 52 is mounted, and FIG. 8B is a drawing showing the upper face of the LED board 56 when an upper housing is removed from CIS;

FIGS. 10A to 10C are drawings schematically showing a relationship between irradiation light applied from LED array and reflected light reflected from a document in document feed states;

FIGS. 11A to 11C are drawings showing relationships between illumination distribution by a LED array during use of a conventional CIS not having shading plates, shading data, and output data after shading correction in document feed states;

FIG. 14 is a drawing showing an example of output data during use of a conventional CIS not having shading plates and output data during use of CIS of this embodiment having shading plates.

DETAILED DESCRIPTION OF THE INVENTION

Hereinafter, embodiments of the present invention will be described in detail with reference to the accompanying drawings.

Figure 1:
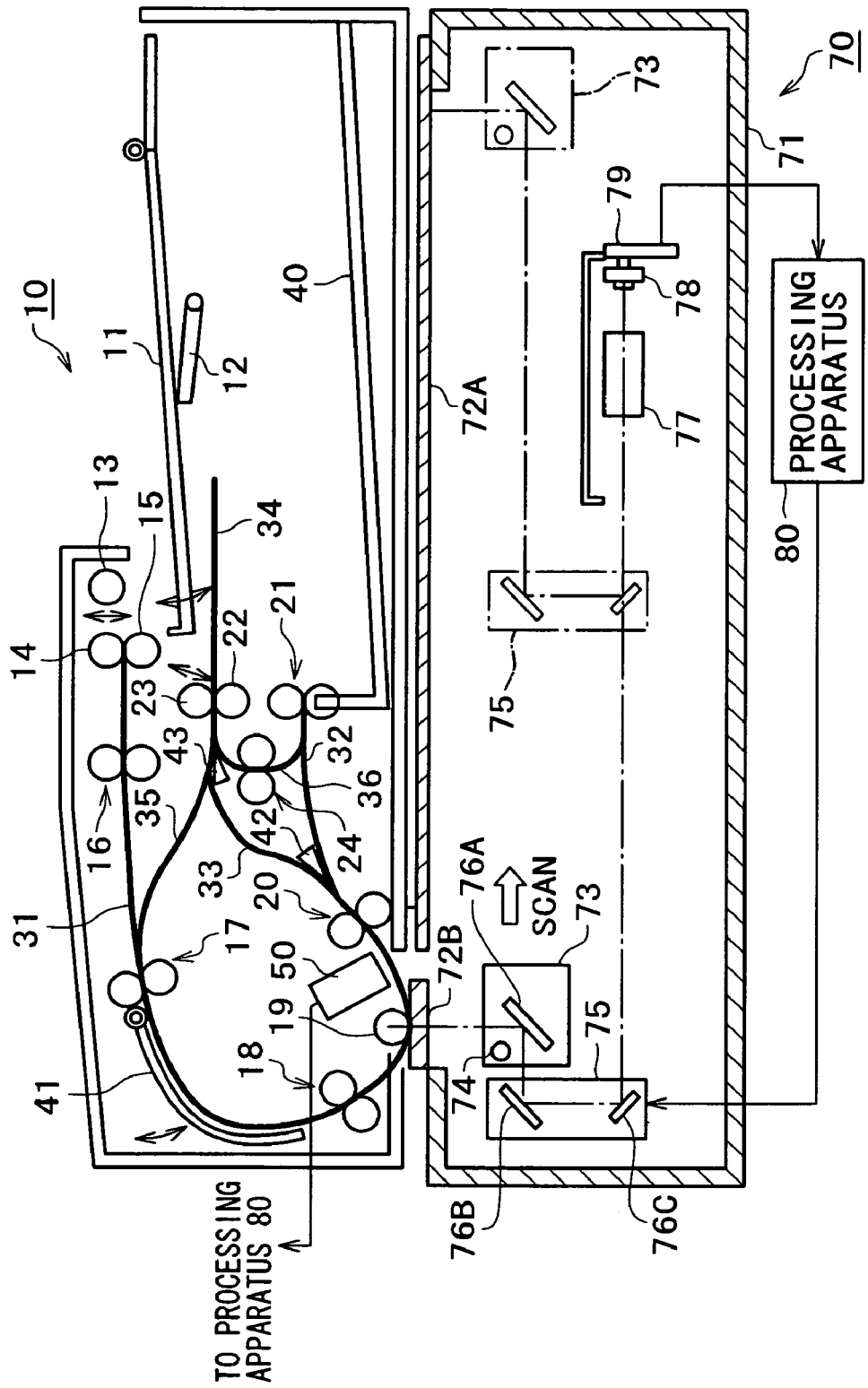
FIG. 1 is a drawing showing an image reading apparatus to which this embodiment is applied.

FIG. 1 is a drawing showing an image reading apparatus to which this embodiment is applied. The image reading apparatus primarily includes: a document feeder 10 as a document feeding member that successively feeds documents from a batch of stacked documents; a scanner 70 as a main unit that scans an image for reading; and a processing apparatus 80 that processes a read video signal.

The document feeder 10 includes a document tray 11 on which a batch of plural document sheets are stacked, and a tray lifter 12 that lifts and lowers the document tray 11. It also includes: a nudger roll 13 that feeds documents on the document tray 11 lifted by the tray lifter 12; a feed roll 14 that feeds documents fed by the nudger roll 13 to a further downstream side; and a retard roll 15 that handles documents supplied by the nudger roll 13 one by one. A first feeding path 31 to which a document is first fed includes: takeaway rolls 16 that feed documents handled one by one to a downstream roll; preregistration rolls 17 that feed documents to a further downstream roll and form a loop; a registration roll 18 that timely restarts rotation after temporary halt and supplies documents while subjecting registration adjustment to a document reading section; a platen roll 19 that assists in feeding a document being read; and lift-out rolls 20 that feed a read document in a further downstream direction. A document feeding section is configured by these rolls. The first feeding path 31 as a feeding path is provided with a baffle 41 that turns around a fulcrum according to a loop state of a document fed. Furthermore, a CIS (Contact Image Sensor) 50 is disposed between a platen roll 19 and the lift-out rolls 20.

A downstream side of the lift-out roll 20 is provided with a second feeding path 32 and a third feeding path 33, as well as a feeding path switching gate 42 that switches between these feeding paths, a discharge tray 40 on which read documents are stacked, and a first discharge roll 21 that discharges documents to the discharge tray 40. Also, there are disposed a fourth feeding path 34 that switches back a document fed via the third feeding path 33; an inverter roll 22 and an inverter pinch roll 23, disposed in the fourth feeding path 34, that actually switch back a document; a fifth feeding path 35 that guides a document switched back by the fourth feeding path 34 again to the first feeding path 31 including the pre-registration rolls 17 and the like; a sixth feeding path 36 that discharges a document switched back by the fourth feeding path 34 to the discharge tray 40; a second discharge roll 24 disposed on a sixth feeding path 36 that feeds a document inversely discharged to the first discharge roll 21; and an exit switching gate 43 that switches between the fifth feeding path 35 and the sixth feeding path. An inverse feeding path is formed by the third feeding path 33, the fourth feeding path 34, and the fifth feeding path 35.

The nudger roll 13 is lifted up during standby and held in an evacuation position, and during document feed, is lowered to a nip position (document feed position) to feed a document at the top position of the document tray 11. The nudger roll 13 and the feed roll 14 feed the document by connecting a feed clutch (not shown in the figure). The pre-registration roll 17 strikes the tip of the document against the stationary registration rolls 18 to form a loop. The registration rolls 18, during loop formation, returns the tip of the document engaged to the registration roll 18 to the nip position. When the loop has been formed, the baffle 41 opens around the fulcrum and functions so as not to hinder the loop of the document. The takeaway rolls 16 and the pre-registration rolls 17 hold a loop during reading. The loop formation adjusts read timing, and suppresses a skew caused by document feed during reading to enhance an alignment function. In accordance with a read start timing, the stationary registration rolls 18 start to rotate and the document is pressed against a second platen glass 72B (described later) by the platen roll 19 to read image data on a lower face of the document.

The feeding path switching gate 42 is switched to guide a document fed via the lift-out rolls 20 to the second feeding path 32 at the end of reading a one-sided document and at the end of concurrent reading of double sides of a double-sided document and discharge it to the discharge tray 40. On the other hand, during successive reading of double-sided documents, the feeding path switch gate 42 is switched to guide the documents to the third feeding path 33 to invert the documents. During successive reading of double-sided documents, the inverter pinch roll 23 is retracted and nip-opened when a feed clutch (not shown) is off, to guide the document to an inverter path (fourth feeding path 34). Then, the inverter pinch roll 23 is nipped and guides the document to be inverted by the inverter roll 22 to the pre-registration rolls 17, and feeds a document to be inversely discharged to the second discharge roll 24 of the sixth feeding path 36.

The scanner 70 includes the document feeder 10 described above, and with the document feeder 10 being supported by an apparatus frame 71, reads images of documents fed by the document feeder 10. The scanner 70 has the apparatus frame 71 forming a first housing that is provided with a first platen glass 72A on which documents whose images are to be read are stationarily put, and a second platen glass 72B that forms an optical opening for reading a document being fed by the document feeder 10. In this embodiment, the document feeder 10 is fitted to the scanner 70 swingably around a fulcrum at the back of the document feeder 10. When documents are set on the first platen glass 72A, the document feeder 10 is lifted to set the documents, and then a cover or the document feeder 10 as a second housing is lowered to and pressed against the scanner 70.

The scanner 70, which is stationary below the second platen glass 72B, includes a full rate carriage 73 that scans the entire first platen glass 72A to read an image, and a half rate carriage 75 that provides light obtained from the full rate carriage 73 to an image coupling section. The full rate carriage 73 is provided with a lighting lamp 74 that applies light to a document, and a first mirror 76A that receives reflected light obtained from the document. Furthermore, the half rate carriage 75 is provided with a second mirror 76B and a third mirror 76C that provide light obtained from the first mirror 76A to an image forming section. The scanner 70 further includes: an image forming lens 77 that optically reduces an optical image obtained from a third mirror 76C; a CCD (Charge Coupled Device) image sensor 78 that performs photoelectric conversion for an optical image formed by the image forming lens 77; and a driving board 79 including a CCD image sensor 78. With this construction, an image signal obtained by the CCD image sensor 78 is sent to the processing apparatus 80 through the driving board 79.

When an image of a document put on the first platen glass 72A is read, the full rate carriage 73 and the half rate carriage 75 move in a scanning direction (the direction of the arrow) at a ratio of 2:1. Here, light of the lighting lamp 74 of the full rate carriage 73 is applied to a read face of the document, and reflected light from the document is reflected in the first mirror 76A, the second mirror 76B, and the third mirror 76C in that order, and is guided to the image forming lens 77. The light guided to the image forming lens 77 forms an image on a light receiving face of the CCD image sensor 78. The CCD image sensor 78, which is an one-dimensional sensor, processes one line of data at the same time. Upon termination of reading the one line in the line direction (fast-scanning direction), the full rate carriage 73 is moved in a direction (slow-scanning direction) orthogonal to the fast-scanning direction to read the next line of the document. By repeating this process over the entire document size, reading of one page of the document is completed.

On the other hand, the second platen glass 72B is configured with a long, plate-like transparent glass plate, for example. A document fed by the document feeder 10 passes through the second platen glass 72B. At this time, the full rate carriage 73 and the half rate carriage 75 are stationary in positions indicated by the solid lines of FIG. 1. Reflected light of one line of the document passing through the platen roll 19 of the document feeder 10 passes through the first mirror 76A, the second mirror 76B, and the third mirror 76C, and an image is formed in the image forming lens 77. Then, the image is read by the CCD image sensor 78, which serves as a first sensor in this embodiment. Specifically, after one line of data in the fast-scanning direction is processed at the same time by the CCD image sensor 78, a one-dimensional sensor, the next one line of the document fed by the document feeder 10 is read. After the tip of the document arrives in a reading position of the second platen glass 72B, when the document has passed through the reading position of the second platen glass 72B, the reading of one page in the slow-scanning direction terminates.

In this embodiment, with the full rate carriage 73 and the half rate carriage 75 being halted, at the same time (means not coincidence of time but feed time of an identical document) when a document is fed to read a first side of the document in the second platen glass 72B by the CCD image sensor 78, a second side of the document can be read by the CIS 50. Specifically, if the document is fed only once to the feeding path, images on both sides of the document can be read using the CCD image sensor 78 and the CIS 50.

Figure 2:
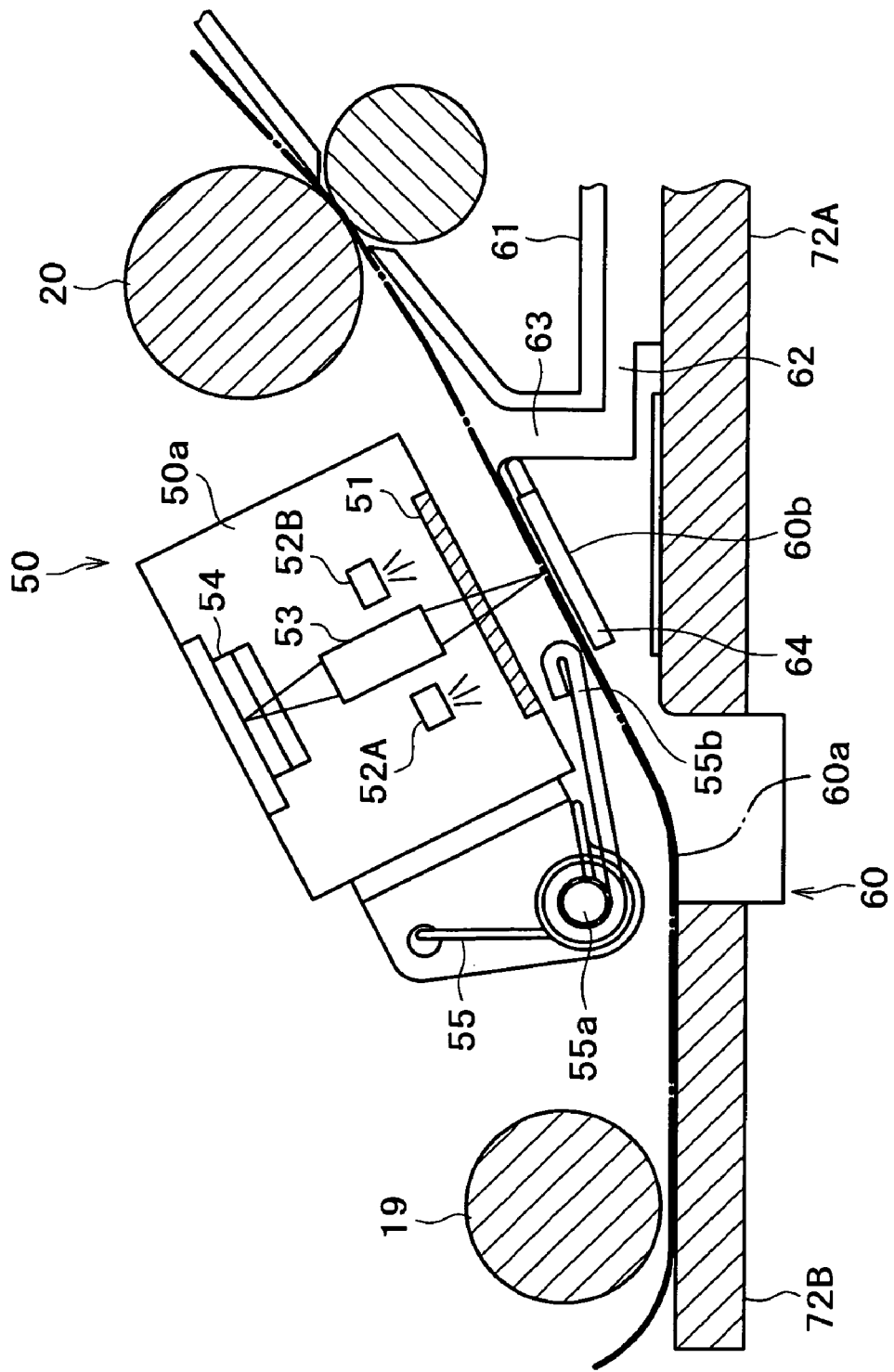
FIG. 2 is a drawing for explaining a structure in the vicinity of CIS.

FIG. 2 is a drawing for explaining the structure of the document feeder 10 in the vicinity of the CIS 50. As shown in FIG. 2, the CIS 50 is disposed between the platen roll 19 and the lift-out roll 20. A one side (first side) of a document is pressed against the second platen glass 72B and an image on the first side is read by the CCD image sensor 78. On the other hand, in the CIS 50, an image on another side (second side) is read from another side opposite to the feeding path for feeding the document. The CIS 50 includes: a housing 50a; a glass 51 fitted to the housing 50a; a light source or a LED (Light Emitting Diode) array 52 as a light irradiating unit that applies light to a second side of a document through the glass 51; a SELFOC lens 53 (a trade name used by the Nippon Sheet Glass Company for a graded-index fiber lens) as a lens that collects reflected light from the LED array 52; and a line sensor 54 as a light receiving sensor or a light receiving unit that reads light collected by the SELFOC lens 53. The LED array 52 includes a first LED array 52A upstream of the document feeding direction and a second LED array 52B downstream of the document feeding direction that are disposed with the SELFOC lens 53 sandwiched. As the line sensor 54, a CCD or CMOS sensor, and a contact type sensor and the like can be used to read images of actual width (e.g., the longitudinal length 297 mm of A4 paper). Since the CIS 50 captures images by use of the SELFOC lens 53 and the line sensor 54 without using a contracted optical system, the structure can be simplified, the housing can be made compact, and power consumption can be reduced. In the case of reading color images, LED light sources of the three colors red (R), green (G), and blue (B) may be incorporated in the LED array 52 and a sensor with a set of three rows for the three colors RGB may be used as the line sensor 54. A detailed configuration of the CIS 50 will be described later.

In image reading by the CIS 50, a feeding path constituting the reading section includes a control member 55 extending from the housing of the CIS 50 and a butting member 60 that butts against a document pressed by the control member 55. The control member 55 is fitted to the document feeder 10 (see FIG. 1) through the CIS 50, while the butting member 60 is fitted to the scanner 70 (see FIG. 1). A guide member 61 is disposed downstream of the butting member 60. An opening 63 is disposed between the guide member 61 and the butting member 60. Furthermore, below the guide member 61 and adjacent to the opening 63, a dust stocker 62 is provided as a section for stocking foreign matter dust and stains adhering to the surface of documents. The control member 55 and the butting member 60 are provided corresponding to the position of the feeding path from the front to the back of the document feeder 10 in a direction orthogonal to a document feeding path (that is, in a direction from the front to the back of the document feeder 10).

The control member 55 is formed by a plate spring made of a sheet plate in the shape of "L" wound around an axis 55a provided in the CIS 50. Since the control member 55 is flexible, the thickness of documents fed can be absorbed, and even documents having bending traces can be stably fed.

The tip of the control member 55 extends to the vicinity of the reading position, and the control member 55 is provided with a hemmed bending portion 55b in a location in which the tip contacts a document, thereby enabling smooth contact with the document and preventing the occurrence of paper particles and the like. A distance between the bending portion 55b of the control member 55 and the butting member 60 (a gap through which a document passes) is set to about 0.1 to 1.0 mm.

On the other hand, the butting member 60, provided upstream of the document feeding direction, includes a feed face 60a that guides a fed document, and a step face 60b formed lower than the feed face 60a downstream of the document feeding direction. The step face 60b is formed to face an extension of a light focus point of the SELFOC lens 53. On the step face 60b, a white reference tape 64 made of biaxially stretched polyester film is stuck as a reference member. Therefore, the white reference tape 64 is fitted to the scanner 70 through the butting member 60. In this embodiment, the white reference tape 64 is disposed with its upper face being exposed to the feeding path. The upper face of the white reference tape 64, that is, a white reference face serving as a reading face is formed slightly (0.2 to 0.3 mm) lower than the feed face 60a.

As has been described above, in this embodiment, the control member 55 is provided to feed a document while pressing it against the butting member 60 by the control member 55 so that the posture of the document between the platen roll 19 and the lift-out rolls 20 can be controlled to be stable. The dot-dashed line arrow shown in FIG. 2 indicates the movement of a document when the control member 55 is disposed. It is understood from the drawing that a document to be fed is fed while being pressed against the butting member 60. That is, by reading a document being fed while pressing it against the butting member 60 by the control member 55, a focusing capability that would be weakened by use of the CIS 50 having short depth of field is enhanced.

Next, the processing apparatus 80 shown in FIG. 1 will be described.

Figure 3:
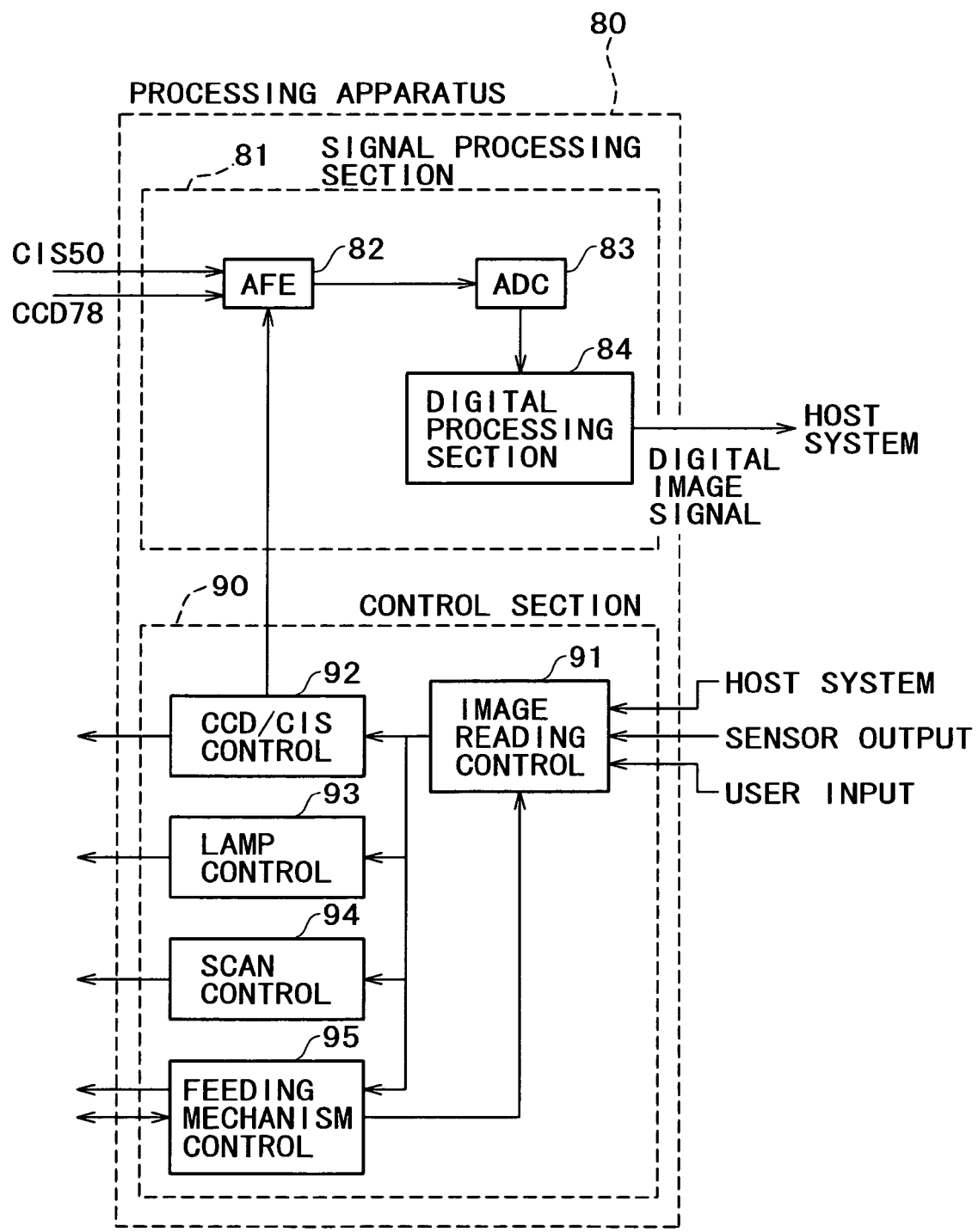
FIG. 3 is a block diagram for explaining a processing apparatus.

FIG. 3 is a block diagram for explaining the processing apparatus 80. The processing apparatus 80 to which this embodiment is applied mainly includes a signal processing section 81 that processes image information obtained from the sensor (CCD image sensor 78 and CIS 50), and a control section 90 that controls the document feeder 10 and the scanner 70. The signal processing section 81 includes an AFE (Analog Front End) 82 that processes analog signals, an ADC (Analog to Digital Converter) 83 that converts analog signals into digital signals, and a digital processing section 84 that performs various processing such as shading correction and offset correction for digital signals. Digital signals processed by the digital processing section 84 are outputted to a host system and outputted to a printer as an image information, for example.

On the other hand, the control section 90 includes: image reading control 91 that controls the whole of the document feeder 10 and the scanner 70 as well as the control of double-sided reading and single-sided reading; CCD/CIS control 92 that controls the CCD image sensor 78 serving as a first sensor and the CIS 50; lamp control 93 that controls the LED array 52 of the CIS 50 and the lighting lamp 74 of the full rate carriage 73 according to read timing; scan control 94 that turns on and off a motor in the scanner 70, and controls scan operation on the full rate carriage 73 and the half rate carriage 75; and feeding mechanism control 95 that controls a motor in the document feeder 10, and controls the operation of the various rolls, the operation of feed clutch, and gate switching operation, and the like. From these controls, control signals are outputted to the document feeder 10 and the scanner 70. The operation control described above is enabled based on such control signals. The image reading control 91 sets a read mode, and controls the document feeder 10 and the scanner 70, based on control signals from the host system, sensor output detected for an automatic selection and reading function, selection from users, and the like.

Here, in this embodiment, when images are read from documents fed by the document feeder 10, documents fed to the platen roll 19 through the second platen glass 72B can be read using the scanner 70 (CCD image sensor 78), and also can be read using the CIS 50 provided in the document feeder 10. However, as described previously, between reading by the CCD image sensor 78 using mechanisms of the scanner 70 and reading by use of the SELFOC lens 53 of the CIS 50, there is a difference in depth of focus, causing a difference in resolution property. Especially when color images such as photographs are read, it is difficult to match colors between the two readings, resulting in a difference occurring in image quality produced between the two readings. Accordingly, in this embodiment, plural read modes are provided so that an optimum mode can be selected depending on apparatus setting status, document type, user selection, and the like.

Figure 4:
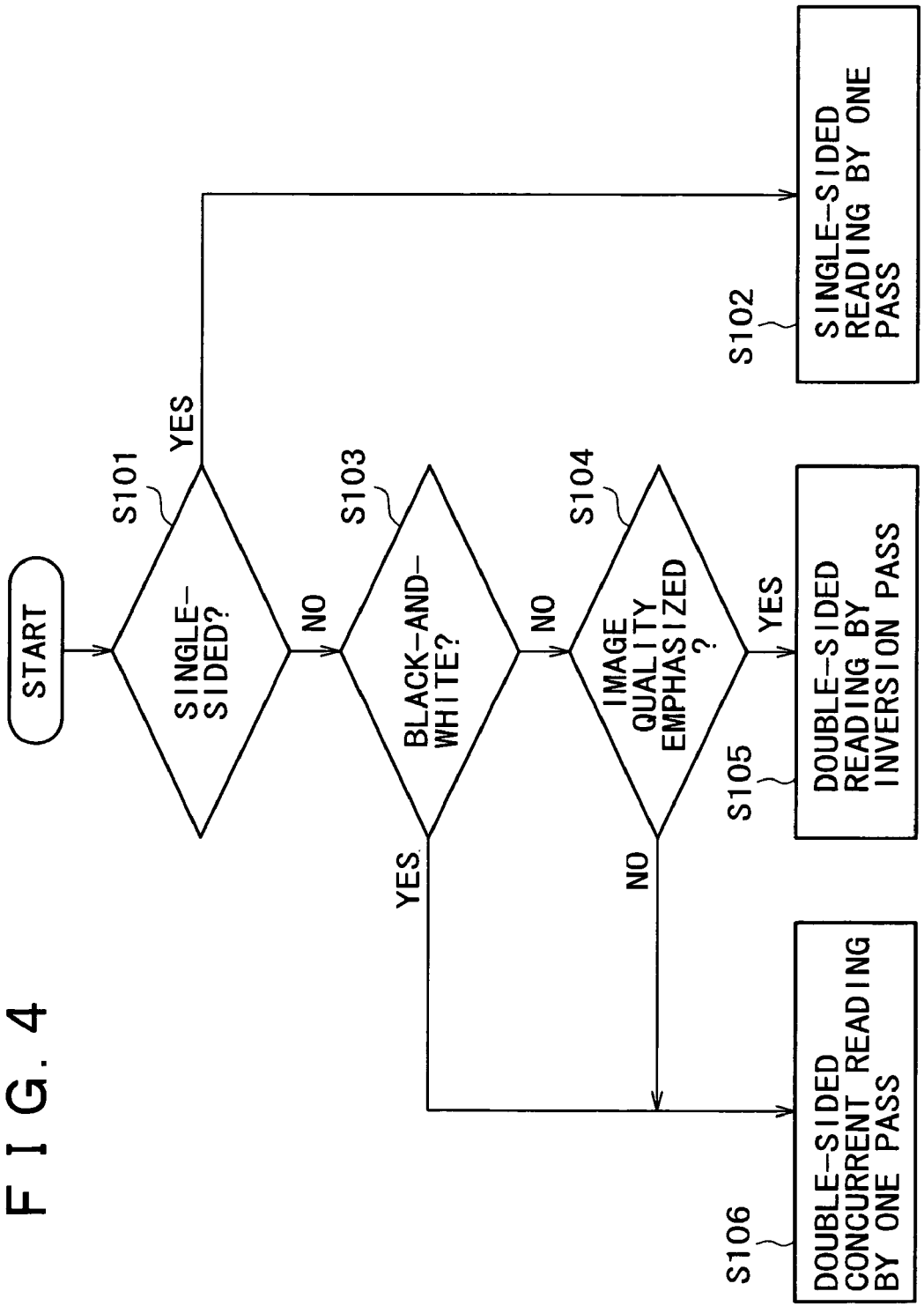
FIG. 4 is a flowchart showing an example of processing executed by image reading control.

FIG. 4 is a flowchart showing an example of processing executed by the image reading control 91 shown in FIG. 3. In the image reading control 91, first, it is determined whether a fed document is a single-sided document (step 101). The determination can be recognized by selection from a user using a control panel (not shown) provided on the scanner 70, or sensors (not shown) provided at both sides of the first feeding path 31 before reading images if the automatic selection and reading function is turned on. Also, a request from the host system and selection from a user over the network are conceivable. If it is determined that the document is a single-sided document in the step 101, single-sided reading in one pass (one document feeding pass not using an inversion pass) is performed (step 102). In the single-sided reading in one pass, any of reading by the CCD image sensor 78 or reading by the CIS 50 may be selected. However, images of higher quality can be obtained by reading by use of the CCD image sensor 78. In this case, documents are placed on the document tray 11 so that they are upward faced and the first page of the documents comes to the top of the documents, and the documents are fed beginning with the first page and successively read.

If it is determined in step 101 that the document is not a single-sided document, that is, if the document is a double-sided document, it is determined whether the document is a black-and-white document (step 103). The determination in the step 103 is recognized as in the step 101 from user selection or the automatic selection and reading function. The user may desire monochromatic reading even for a color document. When color reading is to be performed instead of monochromatic reading, it is determined whether image quality is emphasized (step 104). For example, for color images such as color photos and brochures, generally, a greater emphasis is placed on image quality than on productivity achieved by an increase in reading speed. Such determination is also made by user settings and the like. If image quality is determined to be emphasized in the step 104, double-sided reading by a inversion pass, which is the first double-sided mode, is performed (step 105). Specifically, without performing reading by the CIS 50, both the first side and the second side of the document are read by the CCD image sensor 78 serving as the first sensor. Thereby, high-quality double-sided reading is enabled which uses reading units having longer depth of focus for both the first side and the second side of the document.

On the other hand, when monochromatic reading is to be performed in the step 103, or in the step 104, if color image output is required but slight tones of business colors and the like are not emphasized, or if image quality is not so emphasized and other factors such as productivity are emphasized as in the case of plus-one color (one color such as red and blue other than black is included), double-sided concurrent reading by one pass without using an inversion pass, a second double-sided read mode, is performed (step 106). That is, the first side is read by the CCD image sensor 78 serving as the first sensor, and the second side is read by the CIS 50 in the same feeding pass for reading. Thereby, since the document need not be fed to identical reading sections, the document reading speed can be enhanced. Furthermore, since the feeding pass is simplified, document feeding troubles such as a document jam can be reduced. As described previously, the term "concurrent reading" does not always mean coincidence of time but reading double sides in one pass at almost the same time without needing inversion, back-feeding, and refeed of document.

The processing flow shown in FIG. 4 may be simplified so that in reading double-sided documents, for black-and-white documents, the double-sided concurrent reading in the step 106 is performed, while color documents are read in succession by the inversion pass of the step 105. Depending on types of document sides, these modes may be mixed for use.

Next, a method of feeding documents in each document read mode will be described using FIGS. 5 and 6.

Figure 5A:
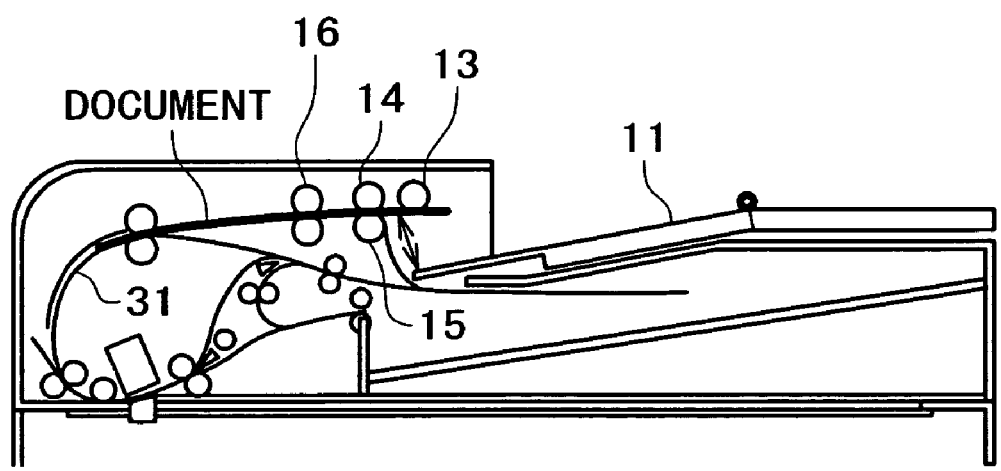
FIGS. 5A and 5B show a document pass of single-sided read mode in one pass, and a document pass of double-sided concurrent read mode by one pass.
Figure 5B:
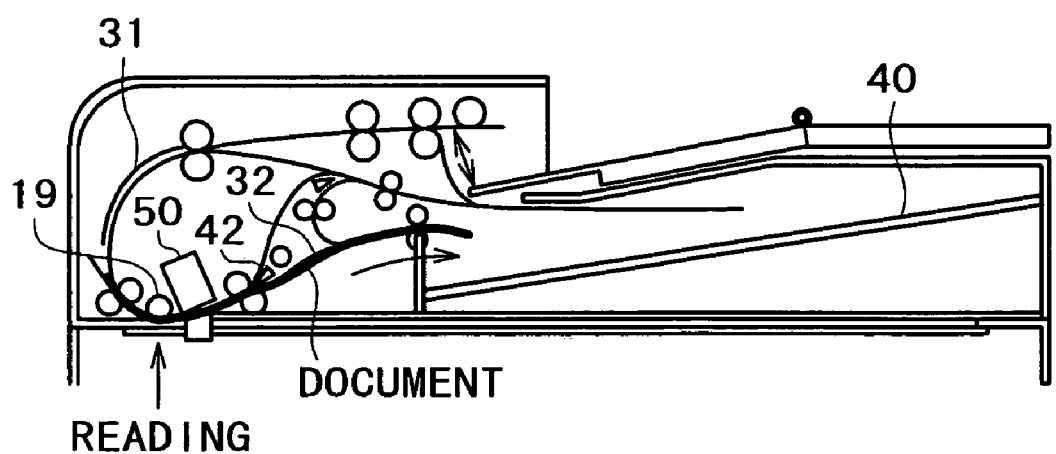

FIGS. 5A and 5B show a document pass of single-sided read mode in one pass shown in the step 102 of FIG. 4, and a document pass of double-sided concurrent read mode by one pass shown in the step 106. As shown in FIG. 5A, documents put on the document tray 11 are successively supplied to the first feeding path 31 by the nudger roll 13, the feed roll 14, the retard roll 15, and the takeaway rolls 16. The supplied documents, as shown in FIG. 5B, pass through the reading section of the platen roll 19a and the reading section of the CIS 50, are moved to the second feeding path 32 by the feeding path switching gate 42, and are successively discharged to the discharge tray 40. In the case of single-sided reading, in the location of the platen roll 19, the documents are read from below using the CCD image sensor 78 of the scanner 70 shown in FIG. 1. However, as described previously, single-sided reading by use of the CIS 50 is also possible. In the case of double-sided concurrent reading in one pass, the first side is read by use of CCD image sensor 78 of the scanner 70, and the second side is read using the CIS 50 during the identical feed. Thereby, both sides of a document can be read in one document pass.

Figure 6A:
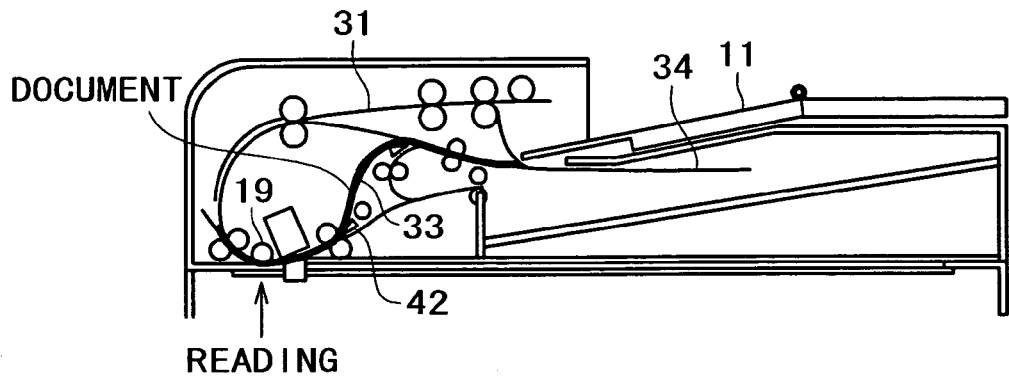
FIGS. 6A to 6D are drawings for explaining double-sided read mode in an inversion pass.
Figure 6B:
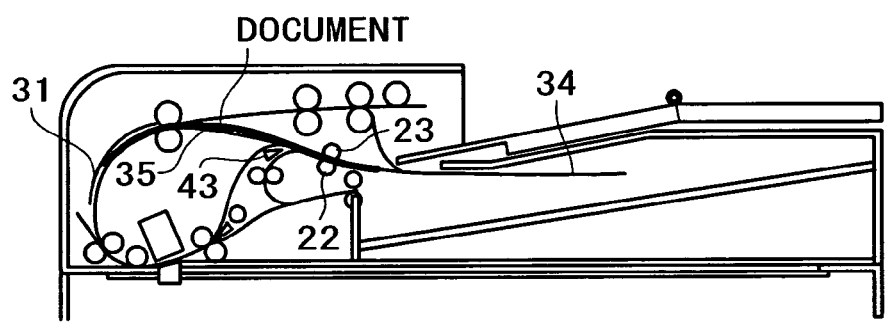

FIGS. 6A to 6D are drawings for explaining the double-sided read mode in the inversion pass shown in the step 105 of FIG. 4. As shown in FIG. 6A, documents put on the document tray 11 are successively supplied to the first feeding path 31 and read from below in the location of the platen roll 19, using the CCD image sensor 78 of the scanner 70 shown in FIG. 1. The documents are moved to the fourth feeding path 34 via the third feeding path 33 by the feeding path switch gate 42. Upon completely exiting from the third feeding path 33, the documents are switched back by the inverter roll 22 and the inverter pinch roll 23 as shown in FIG. 6B, and are supplied to the fifth feeding path 35.

Figure 6C:
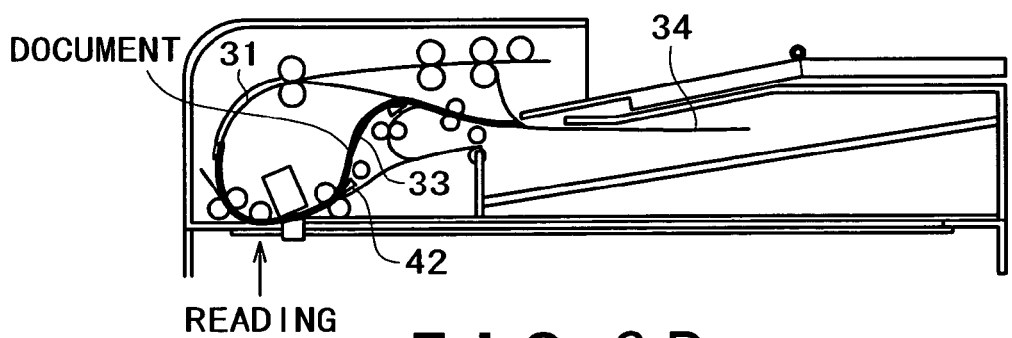
Figure 6D:
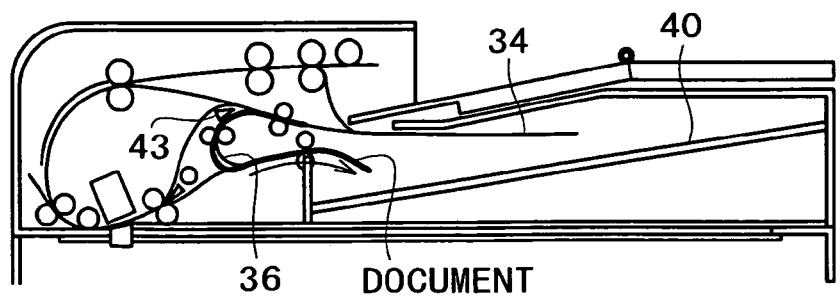

The documents supplied to the fifth feeding path 35 are supplied to the first feeding path 31 again. As shown in FIG. 6C, the documents are read from below by the CCD image sensor 78 of the scanner 70. Here, the documents are turned upside down with respect to the case shown in FIG. 6A so that the second side different in side from the first side is read. The documents the second side of which has been read are upside down, and if they were discharged intact to the discharge tray 40, the stacked already-read documents would go out of page sequence. Accordingly, as shown in FIG. 6C, the documents the second side of which has been read are moved to the fourth feeding path 34 via the third feeding path 33 by the feeding path switch gate 42. The documents that are supplied to the fourth feeding path 34 and have completely passed through the exit switching gate 43, as shown in FIG. 6D, are discharged to the discharge tray 40 via the sixth feeding path 36 by the exit switching gate 43. Thereby, in the first double-sided read mode in which images on both sides of documents are successively read, it becomes possible to stack the already-read documents in an orderly page sequence.

As has been described above in detail, according to this embodiment, the first double-sided read mode and the second double-sided read mode are provided. In the first double-sided read mode, after one side (first side) of a document has been read using the CCD image sensor 78 serving as the first sensor, the document is inverted to read another side (second side) in succession by the first sensor. In the second double-sided read mode, together with the first sensor, using the CIS 50 provided opposite to the first sensor across a feeding path, both sides (first and second sides) of a document are read by one feed. These modes can be selected as required, automatically, or based on user specification. By this construction, these modes can be appropriately selected and used according to purposes such as black-and-white output or color output, emphasis on speed (productivity), and emphasis on image quality.

In the above description, the read modes are selected by the image reading control 91 of the processing apparatus 80. However, the processing may be performed, for example, by a host system that controls the whole of image processing apparatuses such as a digital color copier.

In the image reading apparatus, in the case of acquiring shading data of the CIS 50 side, the following operation is performed before the operation of reading document is started. First, the LED array 52 is turned on to acquire reflected light from the white reference tape 64 as reflected light data via the SELFOC lens 53 and the line sensor 54. Next, shading data is generated based on the acquired reflected light data from the white reference tape 64 in the digital processing section 84 of the processing apparatus 80, and stored in a memory not shown. During actual document reading, image data obtained by reading a document in the CIS 50 is corrected using the shading data stored in the memory not shown and outputted to the host system after density nonuniformity due to a light quantity distribution of the LED array 52 is eliminated. The shading data can be acquired at an appropriate timing, for example, before a job is started, or for each of sheets to read images from.

Next, the configuration of the CIS 50 will be described in detail. FIG. 7 is a sectional view of the CIS 50. A housing 50a of the CIS 50 includes an upper housing 501 fitted with the glass 51, and a lower housing 502 that is provided below with the upper housing 501 and fitted with the LED array 52, the SELFOC lens 53, and the like. Side ends of the upper housing 501 and the lower housing 502 are respectively provided with screw holes 501a and 502a for attachment to a frame not shown. In an upper portion of the lower housing 502, a lens supporting section 502b for supporting the SELFOC lens 53 by fitting it is projectingly formed.

Furthermore, the LED array 52 fitted to the lower housing 502 is formed on the LED board 56 provided at both sides of the lens supporting section 502b and fitted to the lower housing 502 through the LED board 56. In this embodiment, since LEDs constituting the LED array 52 are disposed in a staggered fashion as described later, only LEDs constituting the first LED array 52A of one side are displayed in FIG. 7. Furthermore, a line sensor board 57 on which the line sensor 54 is upward mounted is fitted in a lower portion of the lower housing 502.

Inside the upper housing 501 is formed a circular reflector face 501b as a reflecting unit or reflector member (reflector) for reflecting irradiation light from the LED array 52. On the upper face of the lens supporting section 502b provided in the lower housing 502, shading plates 58 are projectingly formed as shading members, adjusting members, light quantity adjusting members, and/or illumination distribution adjusting units, which extend horizontally toward the reflector face 501b. Since the shading plates 58 are provided corresponding to LEDs constituting the first LED array 52A and the second LED array 52B, one shading plate 58 is shown in FIG. 7.

FIG. 8A is a drawing showing the upper face of the LED board 56 on which the LED array 52 is mounted, when viewed from a feeding path side. FIG. 8B is a drawing showing the upper face of the LED board 56 fitted to the lower housing 502 when viewed from a feeding path side when the upper housing 501 is removed from the CIS 50. FIG. 7 corresponds to the VII-VII section of FIG. 8B.

As shown in FIG. 8A, the first LED array 52A constituting the LED array 52 includes 10 LEDs 52a to 52j equally spaced, and the second LED array 52B constituting the LED array 52 also includes 10 LEDs 52k to 52t equally spaced. The LED array 52 is configured with the LEDs 52a to 52t as plural illuminants or plural point light sources. The LEDs 52a to 52j constituting the first LED array 52A and the 10 LEDs 52k to 52t constituting the second LED array 52B are arrayed in a staggered fashion. As shown in FIG. 8B, the shading plates 58

(58*a* to 58*t*) fitted to the lens supporting section 502*b* of the lower housing 502 are formed to be positioned above the LEDs 52*a* to 52*t*, corresponding to them.

Figure 9:
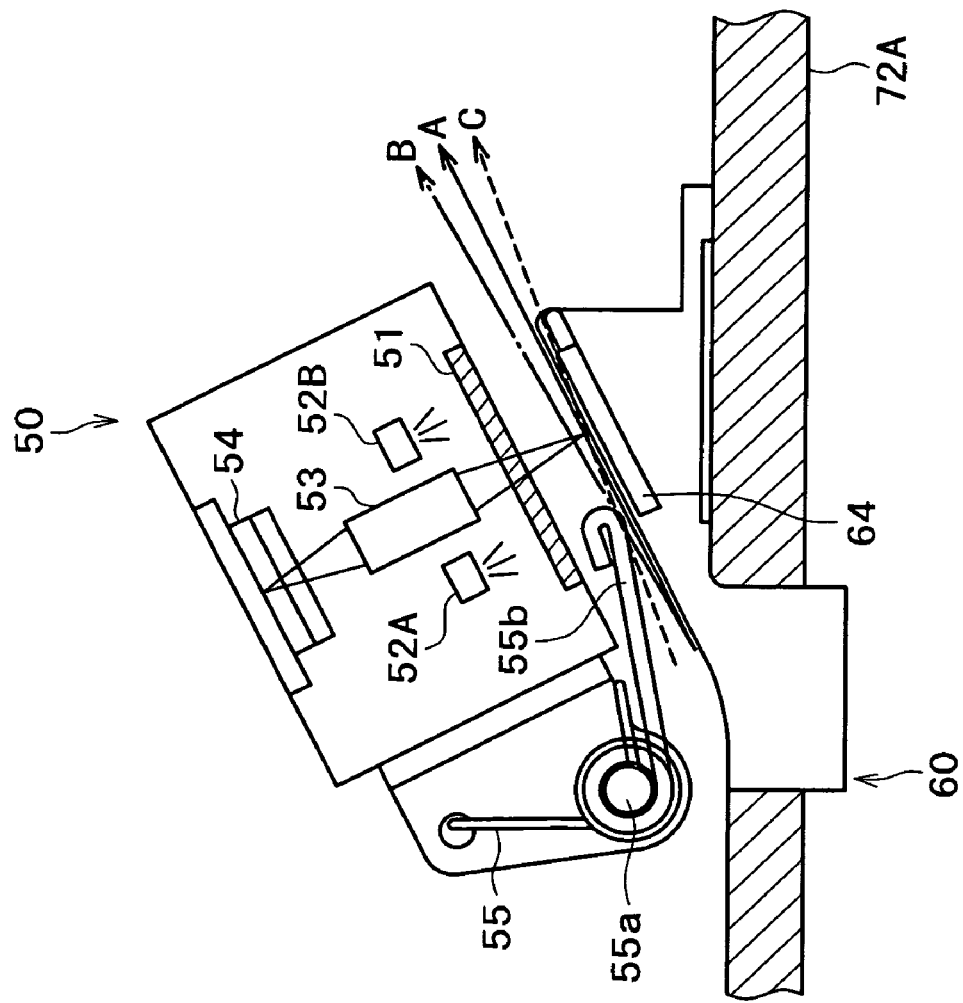
FIG. 9 is a drawing for explaining the posture of a document fed through a portion opposite to CIS 50.

By the way, in the image reading apparatus according to this embodiment, as described above, the posture of documents is controlled to be stable by pressing the documents against the butting member 60 by the control member 55. However, if the documents are soft or creased, their posture may temporarily collapse. Also, in the tip or rear end of documents in a feeding direction, their posture may collapse due to a curl or the like. Here, FIG. 9 is a drawing for explaining the posture of a document fed through a portion opposite to the CIS 50. In the drawing, the arrow A indicates a document feeding direction when the posture of the document does not collapse, the arrow B indicates a document feeding direction when the posture of the document has become upward, and the arrow C indicates a document feeding direction when the posture of the document has become downward.

FIGS. 10A to 10C schematically show a relationship between irradiation light applied from the LED array 52 and reflected light reflected from the document in the document feed states shown in FIG. 9.

As shown in FIG. 10A, when the document is fed in the direction of the arrow A, that is, when the posture of the document does not collapse, reflected light reflected from the document to which light has been applied from the first LED array 52A, and reflected light reflected from the document to which light has been applied from the second LED array 52B enter the SELFOC lens 53 substantially equally.

In contrast to this, as shown in FIG. 10B, when the document is fed in the direction of the arrow B, that is, when the posture of the document is upward, according to an amount of inclination of the document, reflected light reflected from the document to which light has been applied from the first LED array 52A easily enters the SELFOC lens 53, while reflected light reflected from the document to which light has been applied from the second LED array 52B has difficulty in entering the SELFOC lens 53. In short, the balance between both is lost.

On the other hand, as shown in FIG. 10C, when the document is fed in the direction of the arrow C, that is, when the posture of the document is downward, according to an amount of backward inclination of the document, reflected light reflected from the document to which light has been applied from the first LED array 52A has difficulty in entering the SELFOC lens 53, while reflected light reflected from the document to which light has been applied from the second LED array 52B easily enters the SELFOC lens 53. In short, in this case, the balance between both will be lost reversely to the example shown in FIG. 10B.

FIGS. 11A to 11C show relationships between illumination distribution by the LED array 52 (the first LED array 52A and the second LED array 52B) during use of a conventional CIS 50 not having the shading plates 58, shading data obtained by reading the white reference tape 64, and output data after shading correction in the document feed states shown in FIGS. 10A to 10C. In the drawings, the blank squares indicate the LEDs 52*a* to 52*j* constituting the first LED array 52A, and the shaded squares indicate the LEDs 52*k* to 52*t* constituting the second LED array 52B. This description assumes that documents on the whole side of which a half-tone image is formed are read.

As shown in FIG. 11A, when the document is fed in the direction of the arrow A, that is, when the posture of the document does not collapse, an illumination distribution of light (hereinafter referred to as an illumination distribution by the first LED array 52A, indicated by the dashed lines in the drawing) entering the line sensor 54 via the SELFOC lens 53 after irradiation by the first LED array 52A and an illumination distribution of light (hereinafter referred to as an illumination distribution by the second LED array 52B, indicated by the solid lines in the drawings) entering the line sensor 54 via the SELFOC lens 53 after irradiation by the second LED array 52B become substantially identical patterns whose directions are reversed alternately, a slightly waving illumination distribution as a whole. This is understood from the reason described using FIG. 10A. Here, shading data obtained by reading the white reference tape 64 has a property reverse to the illumination distribution. In this case, output data obtained by performing shading corrections after reading a document on which a half-tone image is formed becomes substantially uniform.

As described using FIG. 2, since a document reading position (reading target position) is slightly nearer to the CIS 50 relative to a reading position of the white reference tape 64, actually, an illumination distribution of a document in the reading position is somewhat different from an illumination distribution in a white reference side of the white reference tape 64. However, the difference is within a permissible range of error and is out of the question if the posture of the document does not collapse.

In contrast to this, as shown in FIG. 11B, when the document is fed in the direction of the arrow B, that is, when the posture of the document is upward, peak values of an illumination distribution by the first LED array 52A become small, while peak values of an illumination distribution by the second LED array 52B become large. This is because light receiving balance has collapsed as described using FIG. 10B. As a result, an illumination distribution as a whole becomes a pattern in which large peaks and small peaks coexist. Here, since the same pattern shown in FIG. 11A is used as shading data, in this case, output data obtained by performing shading corrections after reading a document on which a half-tone image is formed does not become uniform, and density variances caused by changes in illumination distributions will remain.

In this case, a difference of illumination distributions due to a difference between a document reading position and a reading position of the white reference tape 64 is amplified by a collapse of the posture of document, causing a bad influence.

On the other hand, as shown in FIG. 11C, when the document is fed in the direction of the arrow C, that is, when the posture of the document is downward, in contrast to the example of FIG. 11B, peak values of an illumination distribution by the first LED array 52A become large, while peak values of an illumination distribution by the second LED array 52B become small. This is because light receiving balance has collapsed as described using FIG. 10C. As a result, an illumination distribution as a whole becomes a pattern in which large peaks and small peaks coexist (a pattern reverse to the example of FIG. 11B). Here, since the same pattern shown in FIG. 11A is used as shading data, also in this case, output data obtained by performing shading corrections after reading a document on which a half-tone image is formed does not become uniform, and density variances caused by changes in illumination distributions will remain.

Also in this case, a difference of illumination distributions due to a difference between a document reading position and a reading position of the white reference tape 64 is amplified by a collapse of the posture of document, causing a bad influence.

Figure 12:
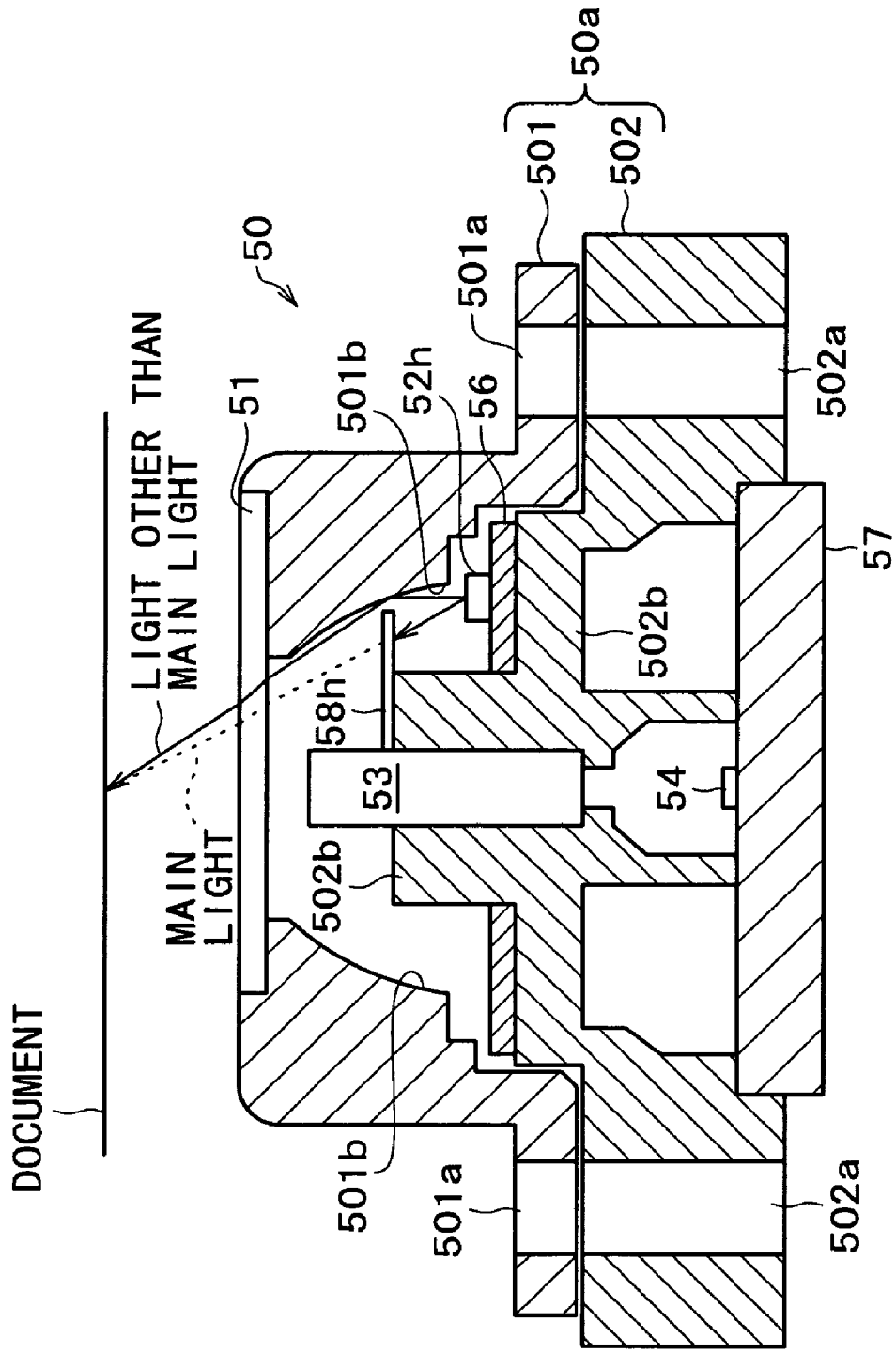
FIG. 12 is a drawing for explaining light irradiation in CIS according to this embodiment in which shading plates are mounted.

FIG. 12 is a drawing for explaining light irradiation in the CIS 50 according to this embodiment in which the shading plates 58 are mounted. A shading plate 58 (e.g., a shading plate 58*h*), mounted above a LED 52*h* constituting the LED array 52, shades main light (indicated by the solid line or dashed line in the drawing) having the highest emission intensity applied from the LED 52*h* to documents fed. Although the main light is shaded by the shading plate 58, since light other than the main light is applied to documents through the reflector face 501b provided in the upper housing 501 or light from other adjacent LEDs is applied to the documents, there will occur no situation where no light falls on the documents. In this embodiment, since the shading plates 58a to 58t are provided above the LEDs 52a to 52t, corresponding to them, main light of the LEDs 52a to 52t is shaded by the shading plates 58a to 58t and a wave of illumination distribution by the first LED array 52A and the second LED array 52B becomes smaller accordingly.

Figure 13A:
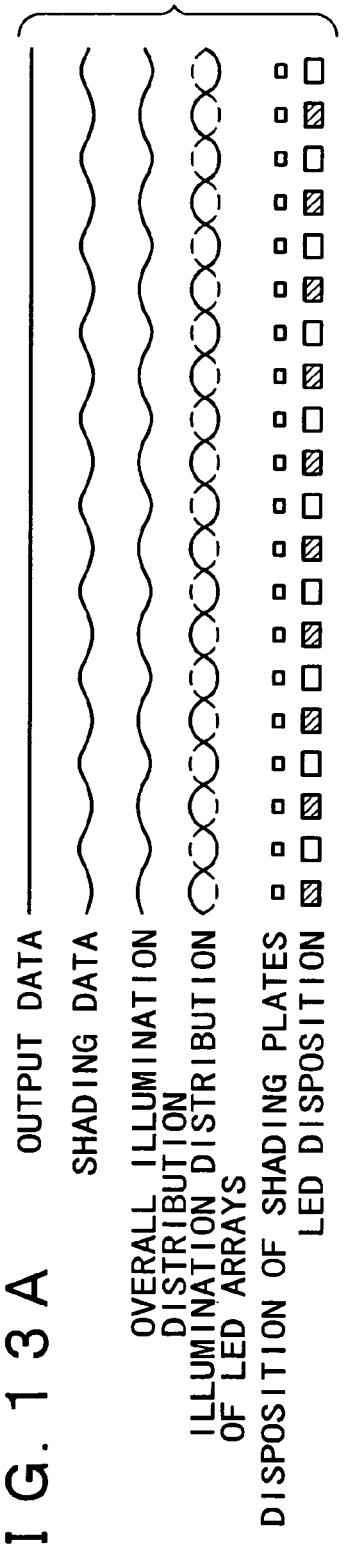
FIGS. 13A to 13C are drawings showing relationships between illumination distribution by a LED array during use of CIS of this embodiment having shading plates, shading data, and output data after shading correction in document feed states.
Figure 13B:
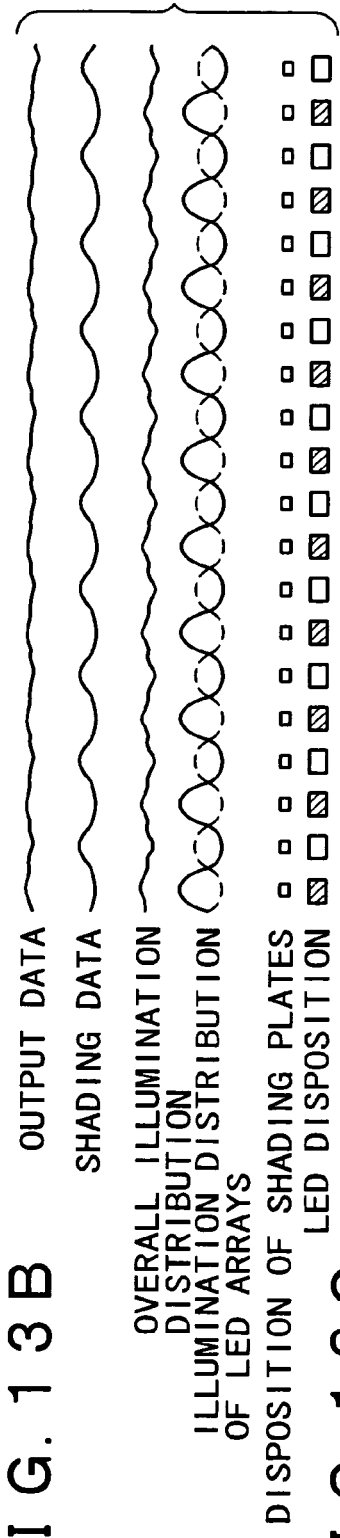
Figure 13C:
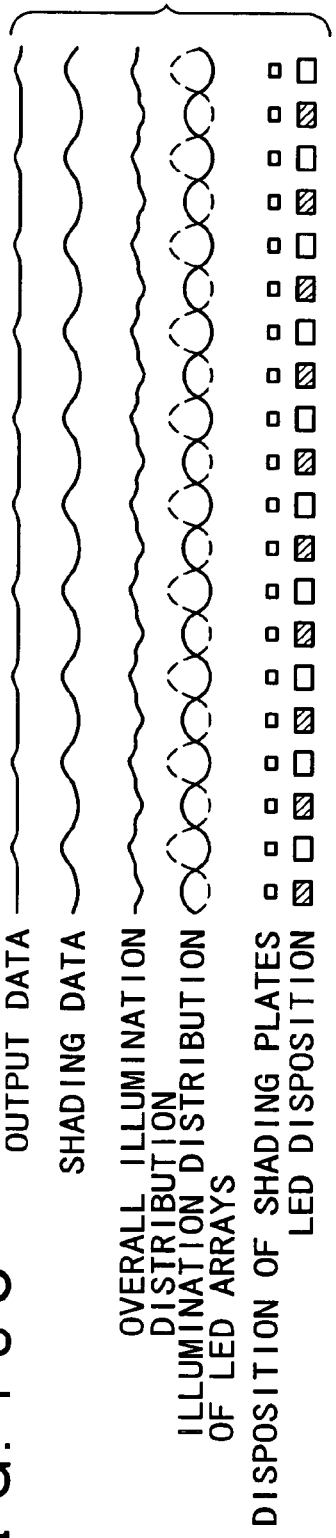

FIGS. 13A to 13C show relationships between illumination distribution by the LED array 52 (the first LED array 52A and the second LED array 52B) during use of a conventional CIS 50 having the shading plates 58, shading data obtained by reading the white reference tape 64, and output data after shading correction in the document feed states shown in FIGS. 10A to 10C. This description also assumes that documents on the whole side of which a half-tone image is formed are read.

As shown in FIG. 13A, when the document is fed in the direction of the arrow A, that is, when the posture of the document does not collapse, an illumination distribution of light (hereinafter referred to as an illumination distribution by the first LED array 52A, indicated by the dashed lines in the drawing) entering the line sensor 54 via the SELFOC lens 53 after irradiation by the first LED array 52A and an illumination distribution of light (hereinafter referred to as an illumination distribution by the second LED array 52B, indicated by the solid lines in the drawings) entering the line sensor 54 via the SELFOC lens 53 after irradiation by the second LED array 52B become substantially identical patterns whose directions are reversed alternately, an illumination distribution that is smooth and substantially uniform as a whole and slightly waving. Here, the shading plates 58 (58a to 58t), which are mounted above the LEDs 52a to 52t, shade main light having the highest emission intensity from being directly applied onto documents, reducing peaks of an illumination distribution in comparison with the case where the shading plates 58 do not exist. Here, shading data obtained by reading the white reference tape 64 has a property reverse to the illumination distribution. In this case, output data obtained by performing shading corrections after reading a document on which a half-tone image is formed becomes substantially uniform.

As shown in FIG. 13B, when the document is fed in the direction of the arrow B, that is, when the posture of the document is upward, peak values of an illumination distribution by the first LED array 52A become small, while peak values of an illumination distribution by the second LED array 52B become large. However, in this embodiment, since main light from the LEDs 52k to 52t constituting the second LED array 52B is shaded by the shading plates 58, changes of peak values of an illumination distribution by the second LED array 52B become remarkably small and are substantially made uniform in comparison with the case where the shading plates 58 are not provided. As a result, an illumination distribution as a whole becomes similar to the pattern shown in FIG. 13A. Here, since the same pattern shown in FIG. 13A is used as shading data, in this case, output data obtained by performing shading corrections after reading a document on which a half-tone image is formed deforms a little but becomes almost uniform.

Furthermore, as shown in FIG. 13C, when the document is fed in the direction of the arrow C, that is, when the posture of the document is downward, in contrast to the example of FIG. 11B, peak values of an illumination distribution by the first LED array 52A become large, while peak values of an illumination distribution by the second LED array 52B become small. However, as described previously, in this embodiment, since main light from the LEDs 52a to 52j constituting the first LED array 52A is shaded by the shading plates 58, changes of peak values of an illumination distribution by the first LED array 52A become remarkably small and are substantially made uniform in comparison with the case where the shading plates 58 are not provided. As a result, an illumination distribution as a whole becomes similar to the pattern shown in FIG. 13A. Here, since the same pattern shown in FIG. 13A is used as shading data, in this case, output data obtained by performing shading corrections after reading a document on which a half-tone image is formed deforms a little but becomes almost uniform.

FIG. 14 shows an example of output data (the left side of the drawing) during use of a conventional CIS 50 not having the shading plates 58 and output data (the right side of the drawing) during use of the CIS 50 of this embodiment having the shading plates 58. This example shows output data in the case where a document on which a half-tone image is formed is fed in a tilted position. In the case where the shading plates 58 are not provided, plural white stripes occur in output data along a document feeding direction. The occurrence positions of the white stripes correspond to disposition positions (positions to which main light is emitted) of the LEDs 52a to 52j (or the LEDs 52k to 52t) in the first LED array 52A (or the second LED array 52B) constituting the LED array 52. If a crease exists in the document, since the inclination of the document changes in the vicinity of the crease, a density pattern will be reversed. On the other hand, in this embodiment, by providing the shading plates 58, an original illumination distribution pattern can be made approximately flat. Accordingly, even if the posture of a document inclined, the white stripes as described above will not occur and substantially uniform output data faithful to an image formed on the document can be obtained.

In this embodiment, light quality is adjusted using the shading plates 58. The present invention is not limited to the embodiment. For example, a filter with stripes formed on its glass face may be used, or shading sections may be formed on a light irradiation face of the LEDs 52a to 52t.

Although, in this embodiment, the shape of the shading plates 58 is rectangular, the present invention is not limited to the embodiment, and their shape may be properly changed according to a required illumination distribution.

In this embodiment, the CIS 50 is stationarily disposed to read documents while feeding them. However, the present invention is not limited to the embodiment. For example, the present invention may also be applied to an image reading apparatus that reads documents stationarily placed on a platen glass while moving the CIS and mirrors below the platen glass.

As described above, the plural point light sources constituting the light source are composed of LEDs (Light Emitting Devices). The image reading apparatus further includes a lens that collects reflected light from the document to which light has been applied from the light source to the light receiving sensor, wherein the plural point light sources constituting the light source are disposed in a staggered fashion at both sides of the lens. Furthermore, the plural point light sources constituting the light source are disposed in a staggered fashion at both sides of the reading position. Also, the image reading apparatus further includes a reflector that reflects irradiation light from the light source toward the reading position. Also, it further includes a reference member disposed inward beyond the reading position by the light receiving sensor.

According to another aspect of the present invention, the image reading apparatus to which the present invention is applied includes: a light source configured with an array of plural point light sources; a light receiving sensor that receives reflected light from a document to which light has been applied from the light source; and adjusting members that perform adjustments so as to reduce variances in illumination distributions of irradiation light applied to the document from the plural point light sources constituting the light source.

The adjusting members attenuate or shade main light in irradiation light applied from the plural point light sources constituting the light source. The image reading apparatus further includes a control member that controls posture of documents fed to a reading position by the light receiving sensor.

Furthermore, according to another aspect of the present invention, an image reading unit to which the present invention is applied applies light to a document by a light irradiating unit having plural illuminants, receives reflected light from the document to which light has been applied by the light irradiating unit in a light receiving unit, and adjusts an illumination distribution of irradiation light applied to the document by the light irradiating unit by an illumination distribution adjusting unit.

The illumination distribution adjusting unit lowers peak values of an illumination distribution of irradiation light applied by the light irradiating unit. Also, the illumination distribution adjusting unit attenuates or shades main light in irradiation light applied from the plural illuminants constituting the light irradiating unit. Furthermore, the illumination distribution adjusting unit makes uniform the illumination distribution of irradiation light applied to the document by the light irradiating unit substantially. The image reading unit further includes a reflecting unit that reflects irradiation light applied by the light irradiating unit toward the document.

As described above, an image reading apparatus according to an aspect of the present invention includes: a light source configured with an array of plural point light sources; a light receiving sensor that receives reflected light from a document to which light has been applied from the light source; and shading members that shade main light in irradiation light applied to a position of document reading by the light receiving sensor from the plural point light sources constituting the light source.

According to another aspect of the present invention, an image reading unit includes: a light source configured with an array of plural point light sources; a light receiving sensor that receives reflected light from a document to which light has been applied from the light source; and light quantity adjusting members, disposed between light emitting points of the plural point light sources constituting the light source and a position of document reading by the light receiving sensor, that attenuate or shade main light in irradiation light applied to the document reading position from the plural point light sources.

The light quantity adjusting members may be longer than the point light sources in a fast-scanning direction. The plural point light sources constituting the light source may be disposed in a staggered fashion at both sides of the light receiving sensor in the fast-scanning direction of the light receiving sensor.

Furthermore, according to another aspect of the present invention, the image reading unit includes: a first LED array composed of plural LEDs arranged in a row; a second LED array composed of plural LEDs arranged in a row, being provided in parallel with the first LED array; a SELFOC lens provided between the first LED array and the second LED array; a line sensor provided in a position in which light is collected by the SELFOC lens; and shading members that are respectively provided above light emitting sections of the plural LEDs constituting the first LED array and the plural LEDs constituting the second LED array and shade main light in irradiation light applied from the LEDs.

The plural LEDs constituting the first LED array and the plural LEDs constituting the second LED array may be disposed in a staggered fashion. The image reading unit may further include a reflector that reflects irradiation light applied from the plural LEDs constituting the first LED array and the plural LEDs constituting the second LED array toward a reading position by the SELFOC lens.

According to another aspect of the present invention, a light irradiation apparatus includes: a light source configured with an array of plural point light sources; and light quantity adjusting members, disposed between light emitting points of the plural point light sources constituting the light source and a position to which light is applied by the light source, that attenuate or shade main light in irradiation light applied to the irradiation position from the plural point light sources.

The light irradiation apparatus may further include a reflector member, provided in the vicinity of the light quantity adjusting members, that reflects irradiation light applied from the plural point light sources constituting the light source toward the irradiation position. The plural point light sources constituting the light source may be disposed at a predetermined interval.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-087928 filed on Mar. 24, 2004 including specification, claims, drawings and abstract is incorporated herein by reference in its entirety.

What is claimed is:

1. An image reading unit comprising:
   a first LED array composed of a plurality of LEDs arranged in a row;
   a second LED array composed of a plurality of LEDs arranged in a row, being provided in parallel with the first LED array;
   a SELFOC lens provided between the first LED array and the second LED array;
   a reflector that reflects irradiation light applied from the plurality of LEDs constituting the first LED array and the plurality of LEDs constituting the second LED array toward a reading position by the SELFOC lens; and
   a line sensor provided in a position in which light is collected by the SELFOC lens; and
   shading members that are respectively provided above light emitting sections of the plurality of LEDs constituting the first LED array and the plurality of LEDs constituting the second LED array and block main light in irradiation light directly applied from the LEDs, wherein the main light has the highest emission intensity applied from the LEDs.

2. The image reading unit according to claim 1, wherein the plurality of LEDs constituting the first LED array and the plurality of LEDs constituting the second LED array are disposed in a staggered fashion.

* * * * *